United States Patent [19]

Zebrowski

[11] Patent Number: 4,507,979

[45] Date of Patent: Apr. 2, 1985

[54] ARRANGEMENT FOR ROTATING THE SHAFT OF AN ELECTRICAL COMPONENT

[75] Inventor: Tadeusz Zebrowski, Cambridge, England

[73] Assignee: U.S. Philips Corporation, New York, N.Y.

[21] Appl. No.: 350,489

[22] Filed: Feb. 19, 1982

[30] Foreign Application Priority Data

Mar. 25, 1981 [GB] United Kingdom ............... 8109380
Nov. 20, 1981 [GB] United Kingdom ............... 8134985

[51] Int. Cl.³ .................. F16H 27/02; F16H 21/44; G05G 1/08
[52] U.S. Cl. ............................. 74/89.22; 74/96; 74/506
[58] Field of Search ............... 74/89.2, 89.22, 96, 74/10.7, 506, 531

[56] References Cited

U.S. PATENT DOCUMENTS

| | | | |
|---|---|---|---|
| 1,213,418 | 1/1917 | Roper | 74/89.22 |
| 1,559,112 | 10/1925 | Lujan | 74/10.7 |
| 2,678,020 | 5/1954 | Jaeger | 74/531 |
| 2,764,894 | 10/1956 | Foxen | 74/89.22 |
| 2,784,595 | 3/1957 | Travis | 74/10.7 |
| 2,828,635 | 4/1958 | Johnson et al. | 74/89.22 |
| 3,932,045 | 1/1976 | Hillberry et al. | 74/89.22 |
| 4,351,197 | 9/1982 | Carson | 74/89.22 |

Primary Examiner—Leslie A. Braun
Assistant Examiner—Michael J. Gonet
Attorney, Agent, or Firm—David R. Treacy

[57] ABSTRACT

An arrangement for adjusting the angular position of a shaft, such as a potentiometer shaft, by frictional coupling to a driving shaft. Grooved pulleys are mounted on each of the shafts, and a tensioned cord is wrapped in a figure of eight fashion about the two grooves. The shafts are spaced apart a distance equal to the sum of the pulley rim radii, and the cord tension holds the pulley rims together in frictional engagement. In studio control panel applications, the driving pulley may be five times the radius of the driven pulley.

15 Claims, 8 Drawing Figures

1

ARRANGEMENT FOR ROTATING THE SHAFT OF AN ELECTRICAL COMPONENT

BACKGROUND OF THE INVENTION

The invention relates to an arrangement for adjusting the value of an electrical component by means of a rotatable driven shaft having a first angle of rotation to produce a change from a first to a second value by means of a control member having a second angle of rotation, the arrangement comprising a first pulley mounted on the shaft of the component, a second pulley coupled to the control member and a cord which extends round the first and second pulleys to transmit rotary motion from the second pulley to the first pulley, the ratio of the core or groove diameters of the pulleys being determined by the desired ratio of the first and second angles of rotation.

In television studio and outside broadcast equipment such as video tape recorders, special effects generators and remote controllers it is frequently desired to utilise the full rotation of a rotary potentiometer, which is typically 300°, while using a control lever which has a smaller sweep angle, for example 60°. Arrangements which have previously been used to achieve this adjustment have involved the use of gear trains, the use of pulley and cord arrangements or the use of friction drums. All these arrangements have disadvantages. Gear trains suffer from backlash and friction drums and pulley and cord arrangements suffer from slip between the components. In addition all these arrangements exert a side thrust on the spindle of the potentiometer causing roughness in operation of the potentiometer and a reduced life for the resistance track and wiper.

SUMMARY OF THE INVENTION

It is an object of the invention to provide an arrangement in which the magnitude of the side thrust on the shaft of the electrical component is reduced.

The invention provides an arrangement for adjusting the value of an electrical component as described in the opening paragraph characterised in that the pulleys are arranged with their rims in contact, that the cord is arranged round the first and second pulleys in a figure of eight formation, and that the ratio of the core diameter of the pulleys is equal to the ratio of the rim diameters of the pulleys.

By arranging the pulleys with their rims in contact the side thrust on the shaft of the component caused by the tension in the cord is reduced since the contact between the pulley rims resists the inwardly directed tensional forces in the cord.

Arranging the cord around the first and second pulleys in a figure of eight formation enables the cord to be clamped at a point in the grooves of the first and second pulleys without unduly restricting the angle of rotation available for the shaft of the component. Clamping the cord reduces the likelihood of slippage between the pulleys. Also this arrangement causes the pulleys to rotate in opposite directions so that there is no sliding friction where the rims of the pulleys touch.

A counterweight may be coupled to the second pulley and be arranged to counterbalance the control member. This reduces the possibility of the arrangement moving when the control member is released.

Means may be provided for enabling the control member to be returned to a preselected position, the means comprising a disc having a notch in its rim, the disc being coupled to the second pulley so as to rotate with it, and a spring loaded ball urged into contact with the rim of the disc.

In order to reduce the likelihood of damage to the component caused by excessive rotation of its shaft means for restricting the angle of rotation of the second pulley may be provided.

Embodiments of the invention will be described, by way of example, with reference to the accompanying drawings.

DESCRIPTION OF THE PREFERRED EMBODIMENTS

Figure 1:
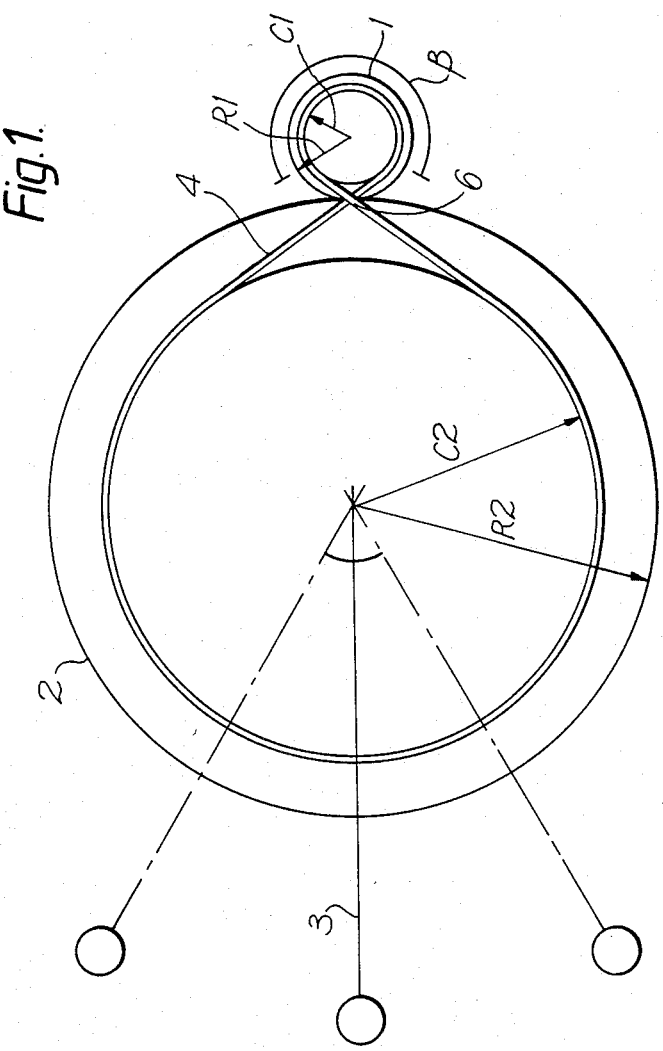
FIG. 1 is a simplified diagrammatic plan view of an arrangement for adjusting the value of an electical component and illustrates the principle of the invention.

The arrangement shown in FIG. 1 comprises a first pulley 1 which is mounted on the shaft of a rotary potentiometer (not shown), a second pulley 2 which is mounted so that its rim is in contact with that of the first pulley 1, a control member in the form of a control lever 3 which is fixed to the second pulley 2, and a cord 4 which runs in the grooves of the pulleys 1 and 2. The pulleys 1 and 2 are constructed so that the ratio of the rim radius $R_1$ of the first pulley 1 to the rim radius $R_2$ of the second pulley 2 is equal to the ratio of the core radius $C_1$ of the first pulley to the core radius $C_2$ of the second pulley. Further the pulleys are mounted with their centers $R_1+R_2$ apart so that the rims are in contact at a point 6.

When the lever 3 is rotated through an angle $\alpha$ the first pulley 1 is caused to rotate through an angle $\beta$ the ratio of the angles $\alpha$ and $\beta$ being given by $(\alpha/\beta)=(R_1/R_2)=(C_1/C_2)$. With this arrangement side thrust on the potentiometer spindle is reduced compared with the arrangements mentioned in the opening paragraphs. As the two pulleys are rotated the tension in the cord 4 causes the pulleys to be pulled against each other and the contact between the rims prevents any sideways movement.

The cord 4 is arranged round the pulleys 1 and 2 in a figure of eight configurations so that the pulleys 1 and 2 have opposite directions of rotation. Consequently at the point 6 the rims of the two pulleys are moving in the same direction and hence, provided that the relation $(R_1/R_2)=(C_1/C_2)$ holds, there will be no slip between the pulleys.

Figure 2:
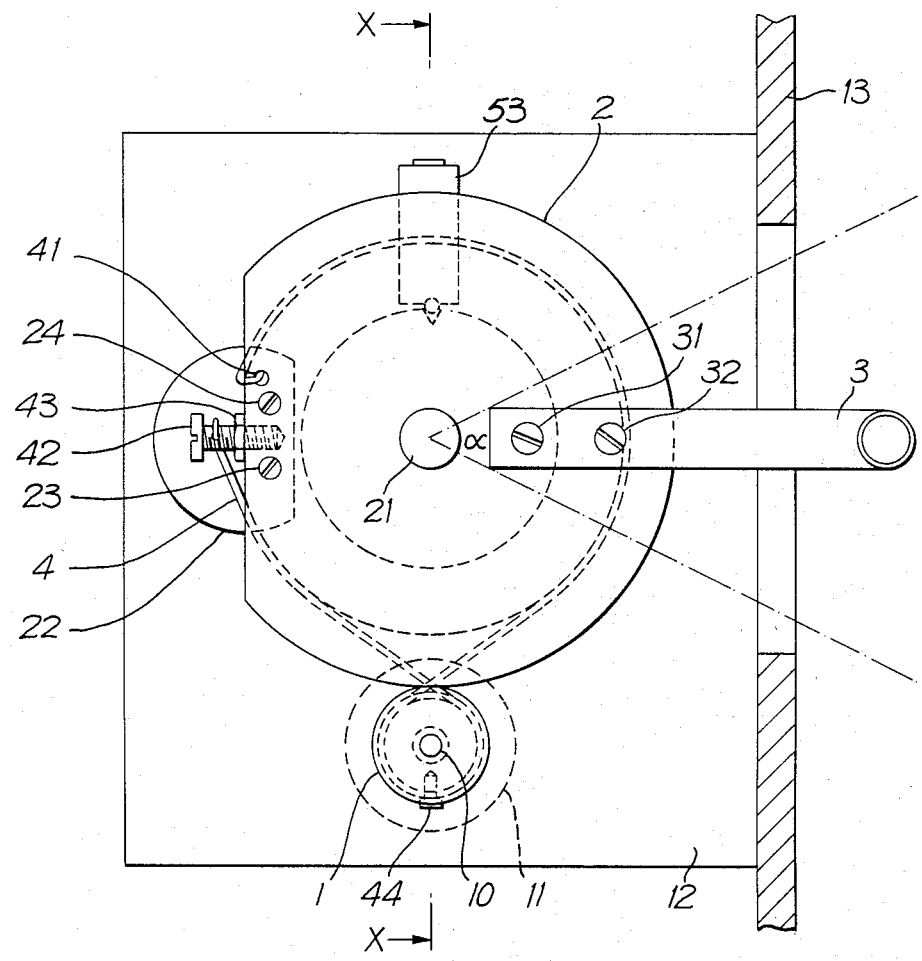
FIG. 2 is a plan view of an embodiment of an arrangement according to the invention for adjusting the value of potentiometer.
Figure 3:
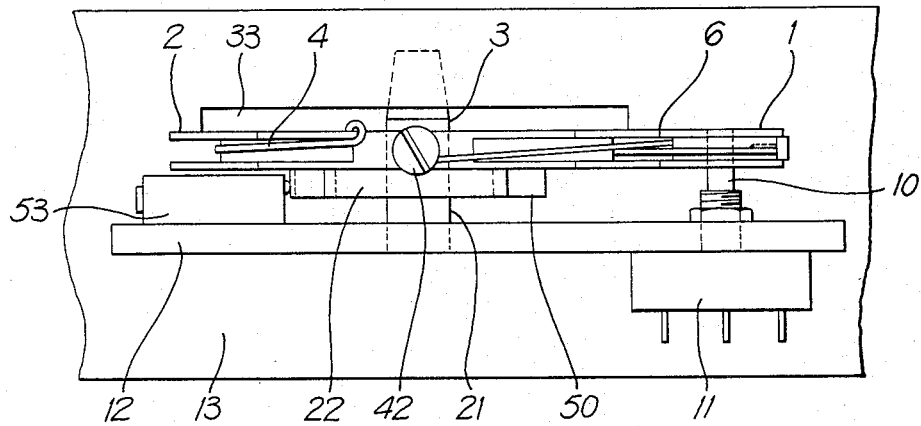
FIG. 3 is an elevation of the arrangement of FIG. 2.
Figure 4:
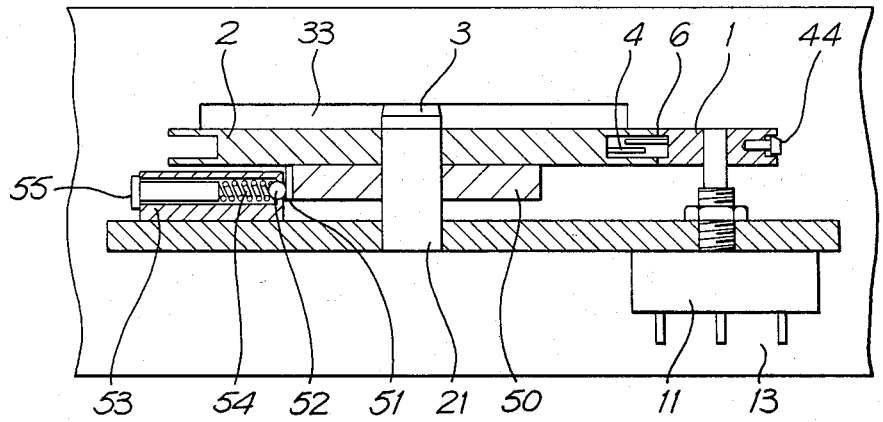
FIG. 4 is a cross-sectional view on line X—X of FIG. 2.

FIGS. 2, 3 and 4 show in greater detail an embodiment of an arrangement according to the invention for adjusting a rotary potentiometer. The first pulley 1 is mounted driven shaft 10 of a rotary potentiometer 11, the potentiometer being mounted on a plate or frame 12 which is in turn connected to a front panel 13. The second pulley 2 is mounted on a driving shaft 21 which is also carried by the plate 12. For simplicity details of the mounting of the shaft 21 in the plate 12 and pulley 3 are omitted since they do not form part of the invention and suitable arrangements would be well known to those skilled in the art. The potentiometer 11 and shaft 21 are mounted so that the distance between the centers of the shaft 21 and the potentiometer shaft 10 is equal to the sum of the rim radii of the pulleys 1 and 2. Thus when the pulleys 1 and 2 are mounted on the shafts 10 and 21 their rims touch at the point 6.

The control lever 3 is fastened to the second pulley 2 by means of screws 31 and 32 and passes through a slot 33 in the front panel 13. A counterweight 22 is fastened by screws 23 and 24 to the pulley 2 diametrically opposite the control lever 3 to balance the weight of the control lever 3 thus reducing the tendency of the arrangement to move from the selected position when the control lever 3 is released.

One end of the cord 4 is located in a hole 41 in the pulley 2 and may be trapped between the pulley 2 and counterweight 22. The cord 4 is then wound in a figure of eight formation round the pulleys 1 and 2 and terminated in a tensioning screw 42 on the pulley 2, the tensioning screw 42 being locked by a nut 43. The cord 4 is also trapped under the head of a screw 44 in the groove 12 of the pulley 1 to prevent slip between the cord 4 and pulley 1. The cord 4 may be a stranded steel cord and should be relatively inextensible.

Movement of the control lever 3 is limited by means of the slot 33 in the control panel 13 so that the second pulley 2 has a restricted angle of rotation α. Since the second pulley 2 has a greater radius than the first pulley 1 the angle β through which the first pulley 1, and hence the shaft 10 of the potentiometer 11, is rotated is greater than the angle α. The ratio of the angles α and β is the inverse of the ratio of the radii R1 and R2. The radii of the pulley cores, i.e. the grooves in which the cord 4 is located, are selected so that the ratio of the core radii C1:C2 is equal to the ratio of the rim radii R1:R2. In this way there will be no slip between the cord 4 and the pulleys 1 and 2 or between the rims of the pulleys 1 and 2 at the point 6.

In order to enable the potentiometer 11 to be easily returned to a preselected position a mechanism comprising a disc 50 having a V-shaped notch 51 and a spring loaded ball 52 in a housing 53 is provided. The housing 53 is fastened to the plate 12 and has within a bore a helical spring 54 which is pressed against the ball 52 by an adjusting screw 55. The disc 50 is coupled to the second pulley 2 so that the pulley 2 and disc 50 rotate together. Thus when the preselected position is reacted the ball 52 will enter the notch 51 in the disc 50. The initial position of the disc 50 may be adjusted to bring the notch 51 to a desired location with respect to the ball 52. This may be achieved by, for example, locking the disc 50 to the shaft 21 by means of screws (not shown) or by clamping the disc 50 to the second pulley 2.

In order to reduce the risk of damage to the potentiometer 11 by excessive rotation of its shaft 10 the slot 33 is dimensioned so as to restrict the movement of the control lever 3 to an angle which ensures that the potentiometer spindle is not rotated through too great an angle. Alternative constructions could be used for the same purpose, for example the pulley 2 could be provided with projections which engage in slots in the plate 13 or the disc 50 could be provided with projections which engage against the housing 53.

Figure 5:
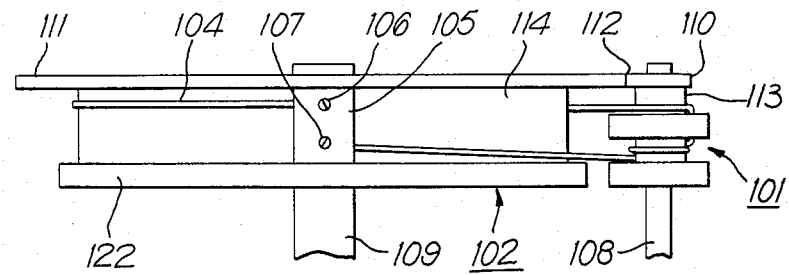
FIG. 5 is an elevation of a further embodiment of an arrangement according to the invention for adjusting the value of an electrical component.
Figure 6:
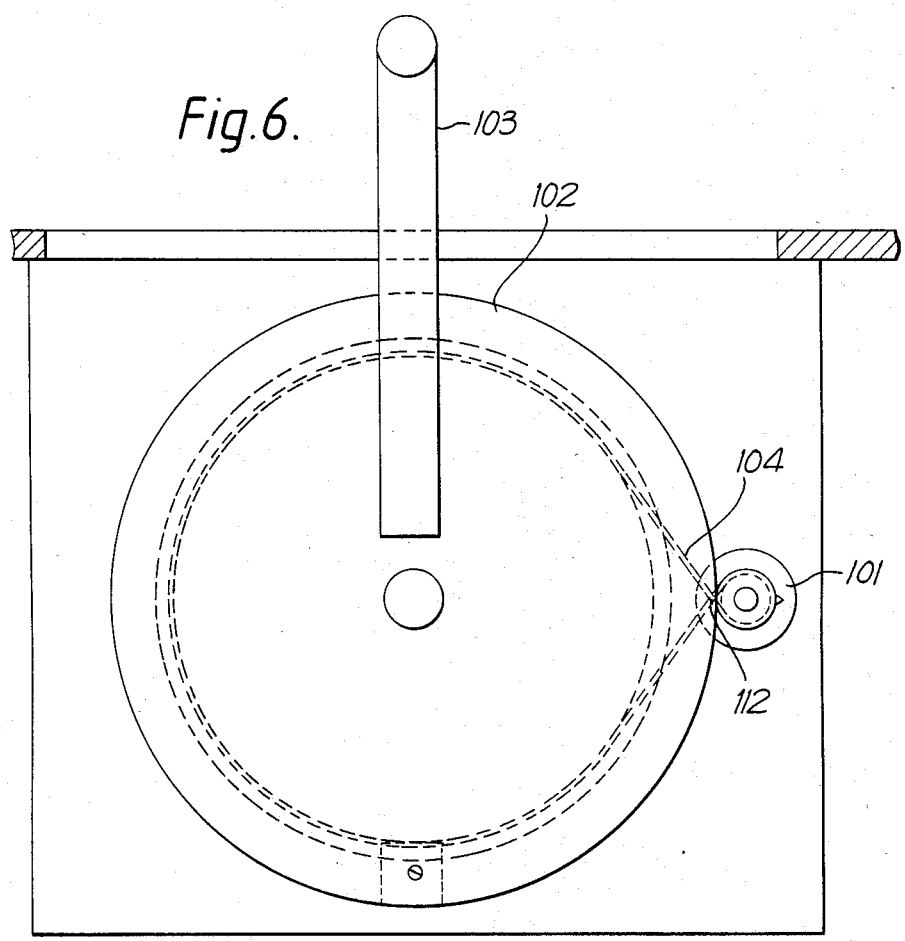
FIG. 6 is a plan view of the embodiment shown in FIG. 5.

The further embodiment shown in FIGS. 5 and 6 comprises a first pulley 101 which is mounted on the shaft of a rotary potentiometer (not shown), a second pulley 102 which is mounted so that its rim is in contact with that of the first pulley 101, a control member in the form of a control lever 103 which is fixed to the second pulley 102, and a cord 104 which runs in the grooves of the pulleys 101 and 102. The cord 104 passes round the pulleys in a figure of eight configuration and its two ends are fixed in a block 105 by means of two clamping screws 106 and 107. The pulleys 101 and 102 are mounted on shafts 108 and 109 which are located so that the rim 110 of pulley 101 is in contact with the rim 111 of pulley 102 at the point 112. The radii of the core 113 of pulley 101 and the core 114 of the pulley 102 are chosen so that the ratio of the rim radii of the pulleys 101 and 102 is equal to the ratio of the core radii of the pulleys 101 and 102 as with the first embodiment. It should be noted that in this embodiment only one rim of each pulley is in contact. This is due to the form of the first and second pulleys as explained hereinafter.

Figure 7:
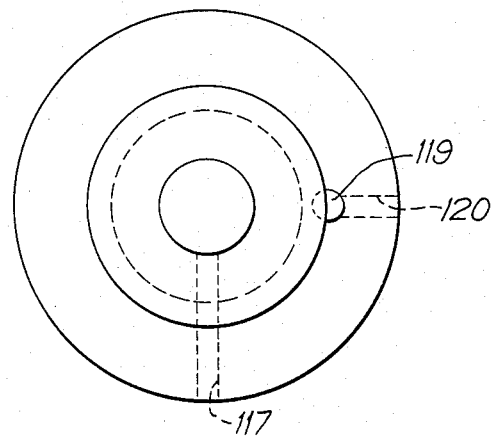
FIG. 7 is an enlarged plan view of the first pulley shown in FIG. 5.
Figure 8:
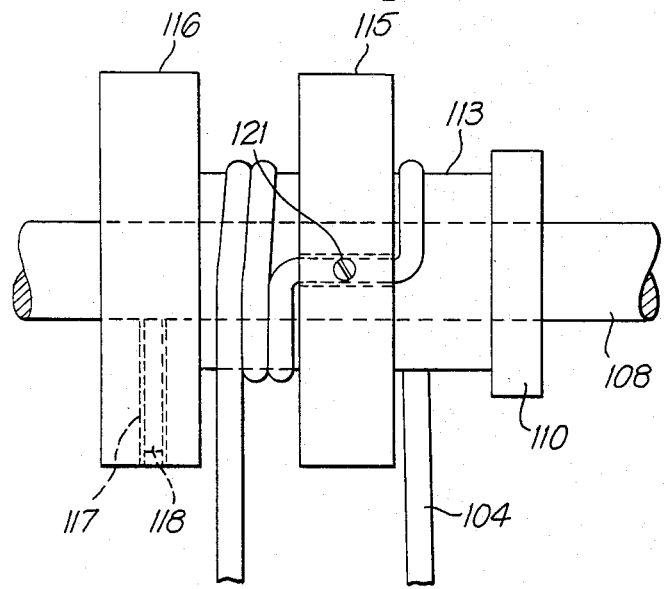
FIG. 8 is an elevation of the pulley shown in FIG. 7.

FIGS. 7 and 8 show the first pulley 101 to an enlarged scale. The pulley 101 comprises a core portion 113 having a flange 115 located midway along its length. At one end of the core portion 113 is the rim 110 while the other end of the core position 113 is provided with a second flange 116. The flange 116 is provided with a threaded hole 117 into which a screw 118 is inserted to key the pulley 101 to the shaft 108. The flange 115 is provided with an aperture 119 which extends parallel to the core 113 from one side of the flange 115 to the other. A threaded hole 120, which extends perpendicular to the aperture 119 and communicates with it, accommodates a grub screw 121 which traps the cord 104 in the aperture 120 to prevent slip between the pulley 101 and the cord 104.

As the pulley 102 is rotated the pulley 101 is rotated by means of the cord 104 which winds onto the core 113 of the pulley 101 on one side of the flange 115 and off the core 113 on the other side of the flange 115. The distance between the flange 115 and both the rim 110 and the flange 116 of the pulley 101 should be chosen to enable the required number of turns of the cord 104 to be accommodated without causing overlapping of the turns otherwise the effective core diameter will be altered.

With the arrangement shown in FIGS. 5 to 8 a rotation of less than one turn of the pulley 102 can cause a rotation of more than one turn of the pulley 101 while still allowing the cord to be fixed at one point on each of the pulleys. If the cord is not fixed on either pulley than a simple one turn arrangement of the cord would also allow and unlimited rotation of the pulleys but in that case slippage between the pulleys may then occur which would cause the calibration of the adjustment to be lost.

For ease of assembly the second pulley 102 is formed with the rim 111 of greater diameter than the rim 122. The rim 122 is dimensioned so that it will retain the cord 104 but not come in contact with the flange 116 of the pulley 101. In this way the pulley 102 may be slid onto the shaft 109 after the pulley 101 has been fixed in position. If the rim 122 was of the same diameter as the rim 111 then the flange 116 would have to be made the same diameter as the rim 110 and the pulleys 101 and 102 would have to be interlocked before being assembled onto the shafts 108 and 109.

Various modifications may be made to the embodiments described without departing from the scope of the invention. For example the control member may be attached to the smaller pulley and the larger pulley attached to the component shaft to give a smaller angle of rotation to the component shaft than to the adjusting shaft. The control member could be formed by the pulley rather than being a separate member. Thus the rim of the pulley would form a thumb wheel for adjustment by a user's finger, and could be serrated over a portion of its circumference. While the embodiments have described an arrangement for adjusting the value of a potentiometer it may be used for adjusting any electrical component such as capacitors or disc encoders.

I claim:

1. An arrangement for frictionally coupling a driving shaft to a parallel driven shaft, comprising
   a frame,
   first and second shafts,
   means for mounting said shafts in a laterally fixed relationship with respect to said frame for rotation about parallel axes spaced a given distance apart,
   first and second pulleys respectively mounted to said first and second shafts, said first pulley having a rim having a first rim radius and a circumferential groove having a first groove radius, said second pulley having a rim having a second rim radius and a circumferential groove having a second groove radius, and
   a tensioned cord arranged around said grooves in a figure of eight formation wherein said cord is a single cord which is passed fully around at least one of said pulleys and is fixedly secured to the other pulley,
   characterized in that the sum of the radii of said rims equals said given distance,
   the tension of said cord biases said rims toward each other so that they are in rolling friction engagement, and
   the ratio of said groove radii equals the ratio of the respective rim radii,
   whereby said thrusts on said shafts resulting from the coupling is reduced.

2. An arrangement as claimed in claim 1, comprising means for clamping the cord at respective points in the grooves of the first and second pulleys.

3. An arrangement as claimed in claim 2, characterized in that said second shaft is a control member shaft, said second groove radius is greater than said first groove radius, and said cord is wrapped around said first groove for more than one turn.

4. An arrangement as claimed in claim 1, characterized in that second shaft is a control member shaft, said second groove radius is greater than said first groove radius, and said cord is wrapped around said first groove for more than one turn.

5. An arrangement as claimed in claim 1, 2, 3 or 4, comprising means for adjusting the tension of the cord.

6. An arrangement as claimed in claim 5, characterized in that said axes are horizontal, and in that the arrangement further comprises a control lever fastened to said second pulley, and a counterweight coupled to the second pulley opposite said control lever.

7. An arrangement as claimed in claim 6, characterized by comprising means for enabling the control member to be returned to a preselected position.

8. An arrangement as claimed in claim 7, characterized in that said means for enabling comprises a disc coupled to the second pulley so as to rotate therewith, and a spring loaded ball urged into contact with the rim of the disc, said disc having a notch in its rim arranged for engagement by the spring-loaded ball when the control member is in the preselected position.

9. An arrangement as claimed in claim 8, characterized by comprising means for restricting the angle of rotation of the second pulley.

10. An arrangement as claimed in claim 9, characterized in that said means for restricting comprises a slot through which the control lever projects, the slot serving to restrict angular movement of the second pulley.

11. An arrangement as claimed in claim 6, characterized in the said means for restricting comprises a slot through which the control lever projects, the slots serving to restrict angular movement of the second pulley.

12. An arrangement as claimed in claim 5, characterized in that said pulley has a rim diameter greater than the rim diameter of the first pulley, and is a control member, a portion of the rim of the second pulley being adapted for direct engagement by a finger of a user to vary the angular position of the second pulley.

13. An arrangement as claimed in claim 1, characterized in that said second pulley has a rim diameter greater than the rim diameter of the first pulley, and is a control member, a portion of the rim of the second pulley being adapted for direct engagement by a finger of a user to vary the angular position of the second pulley.

14. An arrangement as claimed in claim 1, comprising means for enabling the second shaft to be returned to a preselected position.

15. An arrangement as claimed in claim 14, characterized in that said means for enabling comprising a disc coupled to the second pulley so as to rotate therewith, and a spring loaded ball urged into contact with the rim of the disc, said disc having a notch in its rim arranged for engagement by the spring loaded ball when the second shaft is in the preselected position.

* * * * *

UNITED STATES PATENT AND TRADEMARK OFFICE
CERTIFICATE OF CORRECTION

PATENT NO. : 4,507,979

DATED : April 2, 1985

INVENTOR(S) : TADEUSZ ZEBROWSKI

It is certified that error appears in the above-identified patent and that said Letters Patent is hereby corrected as shown below:

Claim 1, line 27 (Col. 5, line 45) change "said thrusts" to --side thrusts--;

Claim 12, line 2 (Col. 6, line 33) change "said pulley" to --said second pulley--

Claim 15, line 2 (Col. 6, line 50) change "comprising" to --comprises--

Signed and Sealed this

Twenty-third Day of July 1985

[SEAL]

Attest:

DONALD J. QUIGG

Attesting Officer     Acting Commissioner of Patents and Trademarks